(12) United States Patent
Kawaguchi et al.

(10) Patent No.: US 12,241,504 B2
(45) Date of Patent: Mar. 4, 2025

(54) ROLLING BEARING

(71) Applicant: NTN Corporation, Osaka (JP)

(72) Inventors: Hayato Kawaguchi, Shizuoka (JP); Toshiki Masuda, Shizuoka (JP)

(73) Assignee: NTN CORPORATION, Osaka (JP)

( * ) Notice: Subject to any disclaimer, the term of this patent is extended or adjusted under 35 U.S.C. 154(b) by 83 days.

(21) Appl. No.: 18/024,153

(22) PCT Filed: Aug. 26, 2021

(86) PCT No.: PCT/JP2021/031325
§ 371 (c)(1),
(2) Date: Mar. 1, 2023

(87) PCT Pub. No.: WO2022/050165
PCT Pub. Date: Mar. 10, 2022

(65) Prior Publication Data
US 2023/0272820 A1    Aug. 31, 2023

(30) Foreign Application Priority Data
Sep. 2, 2020 (JP) .................... 2020-147432

(51) Int. Cl.
| | |
|---|---|
| *F16C 19/06* | (2006.01) |
| *F16C 19/52* | (2006.01) |
| *F16C 33/58* | (2006.01) |
| *F16C 33/62* | (2006.01) |

(52) U.S. Cl.
CPC ........... *F16C 19/06* (2013.01); *F16C 19/52* (2013.01); *F16C 33/586* (2013.01); *F16C 33/62* (2013.01); *F16C 2202/30* (2013.01)

(58) Field of Classification Search
CPC ........ F16C 19/06; F16C 19/52; F16C 33/586; F16C 35/06–077; F16C 2202/30; H02K 5/173
See application file for complete search history.

(56) References Cited

U.S. PATENT DOCUMENTS

| | | | |
|---|---|---|---|
| 2014/0270616 A1* | 9/2014 | Umemoto | ............ F16C 35/067 384/569 |
| 2017/0284468 A1 | 10/2017 | White | |
| 2019/0003529 A1* | 1/2019 | Motoda | ................ F16C 33/586 |

FOREIGN PATENT DOCUMENTS

| | | |
|---|---|---|
| DE | 101 37 785 | 2/2003 |
| JP | 55-10111 | 1/1980 |
| JP | 60-85626 | 6/1985 |
| JP | 1-182621 | 7/1989 |
| JP | 6-53824 | 7/1994 |

(Continued)

OTHER PUBLICATIONS

Machine Translation of JP H06-53824 (Year: 1994).*

*Primary Examiner* — Alan B Waits
(74) *Attorney, Agent, or Firm* — Wenderoth, Lind & Ponack, L.L.P.

(57) ABSTRACT

A bearing device includes an inner ring and an outer ring. At least one of the radially inner surface of the inner ring and the radially outer surface of the outer ring is covered with a coating layer. The coating layer is a coating layer composite composed of a plurality of layers. Of the plurality of layers, the surface layer is composed of an anti-creep film having lubricity, and at least one layer other than the surface layer is composed of an insulating film having insulating properties.

12 Claims, 3 Drawing Sheets

(56) References Cited

FOREIGN PATENT DOCUMENTS

| | | | |
|---|---|---|---|
| JP | H0653824 U | * | 7/1994 |
| JP | 2002-266870 | | 9/2002 |
| JP | 2007-292119 | | 11/2007 |
| JP | 2008-095884 | | 4/2008 |
| JP | 2013-199954 | | 10/2013 |
| JP | 6338035 | | 5/2018 |
| JP | 2019-138467 | | 8/2019 |

* cited by examiner

ROLLING BEARING

TECHNICAL FIELD

The present invention relates to a rolling bearing.

BACKGROUND ART

When mounting a rolling bearing between a shaft and a housing, the inner ring of the rolling bearing is fitted onto the shaft, and the outer ring is fitted to the inner periphery of the housing. The fit between the inner ring or the outer ring and the corresponding shaft or housing is selected, taking into consideration the loading conditions, assemblability of the device, etc., from among an interference fit, a normal fit and a clearance fit. If a clearance fit is selected for the inner ring or the outer ring, the inner ring or the outer ring which is in a clearance fit may creep, that is, rotate in the circumferential direction relative to the mating member, namely the shaft or the housing.

By way of example, in a bearing assembly including a rolling bearing through which a shaft of, for example, an automotive transmission or an EV (electric vehicle) motor is supported on a housing, for easy mounting of the rolling bearing to the housing, its outer ring is fitted to the housing in a clearance fit, and the clearance fit could result in creeping of the outer ring due to unbalanced load on the shaft under high loads or during high-speed rotation.

To address this problem, Japanese Patent No. 6338035 proposes a rolling bearing which stably maintains good anti-creep performance. This rolling bearing includes a calcined film on the radially outer surface of the outer ring, which is a fitting surface with the housing, or on the radially inner surface of the inner ring, which is a fitting surface with the shaft. This calcined film contains an organic binder, solid lubricant powder such as molybdenum disulfide powder, and a friction/wear adjustor such as antimony oxide powder.

In a bearing supporting an EV motor, discharge may occur between the rolling elements and the raceway surfaces due to leakage current from the motor. The discharge could cause electrolytic corrosion damage to the inner ring, the outer ring or the rolling elements.

To address this problem, Japanese Utility Model No. S60-85626 proposes a structure capable of preventing electrolytic corrosion of a rolling bearing. This rolling bearing includes ceramic films impregnated with a synthetic resin having insulating properties and formed on the radially inner surface and the end surfaces of the inner ring, and on the radially outer surface and the end surfaces of the outer ring.

However, in the rolling bearing of Japanese Patent No. 6338035, although containing solid lubricant powder, and a friction/wear adjustor, if this bearing is used for supporting the shaft of an EV motor, there is a concern that leakage current from the motor passes through the bearing, causing discharge between the rolling elements and the raceway surfaces, resulting in electrolytic corrosion damage.

On the other hand, in the rolling bearing of Japanese Utility Model No. S60-85626, while ceramic coatings are used in order to provide electrolytic corrosion resistance, if the outer ring or the inner ring creeps, because its fitting surface with the shaft or the housing lacks lubricity, friction and wear to such an extent as to affect the shaft supporting function could occur at the fitting surfaces of the bearing ring that has creeped and the corresponding housing or shaft.

SUMMARY OF THE INVENTION

In view of the above-described background, the object of the present invention is to provide a rolling bearing which achieves, in an environment where leakage current is transmitted to the inner ring or the outer ring, and the inner ring or the outer ring is fitted in a clearance fit to the corresponding shaft or housing, both the creep resistance and the electrolytic corrosion resistance.

In order to achieve this object, the present invention provides a rolling bearing comprising an inner ring having a radially inner surface, an outer ring having a radially outer surface, and rolling elements disposed between the inner ring and the outer ring. At least one of the radially inner surface of the inner ring and the radially outer surface of the outer ring is covered with a coating layer, and the coating layer comprises a coating layer composite composed of a plurality of layers. A surface layer of the plurality of layers of the coating layer composite is composed of an anti-creep film having lubricity, and at least one of the plurality of layers of the coating layer composite excluding the surface layer is composed of an insulating film having insulation properties.

In this arrangement, the anti-creep film, which is a surface layer of the plurality of layers of the coating layer composite that covers the radially inner surface of the inner ring or the radially outer surface of the outer ring, is a fitting surface with the shaft or the housing. Thus, the anti-creep film exhibits lubricity during creeping, thereby preventing friction and wear at the fitting surface of the radially inner surface of the inner ring or the radially outer surface of the outer ring, and the fitting surface of the corresponding shaft or housing. Also, since at least one of the plurality of layers of the coating layer composite excluding the surface layer is composed of an insulating film having insulating properties, the insulating layer breaks the circuit of the flow of leakage current, preventing discharge between the inner ring or the outer ring and the rolling elements, and thereby preventing electrolytic corrosion damage to the inner ring, outer ring and rolling elements. In other words, the rolling elements of the above-described structure provides both of the above-described two benefits.

The insulating film is, for example, a calcined film containing at least one of a ceramic material, an epoxy-based resin and a polyamide-based resin.

The anti-creep film is, for example, a sintered film containing a resin binder and solid lubricant powder.

Preferably, the insulating film of the coating layer composite includes a side covering portion covering one of two side surfaces defining the width of the outer ring, or one of two side surfaces defining the width of the inner ring.

Preferably, the anti-creep film of the coating layer composite includes an extended covering portion covering one of a portion of the inner ring other than the radially inner surface thereof, and a portion of the outer ring other than the radially outer surface thereof, the extended covering portion being in contact with the shaft or the housing.

By employing the above configuration, the present invention provides a rolling bearing which, in a use condition of the rolling bearing in which leakage current reaches the inner ring or the outer ring, and in which the inner ring or the outer ring is in a clearance fit with, respectively, the shaft or one of the housing and the flange bracket, the rolling bearing exhibits both creep resistance that prevents friction and wear at the fitting surfaces, and resistance to electrolytic corrosion that prevents electrolytic corrosion of the bearing races and the rolling elements.

DETAILED DESCRIPTION OF THE INVENTION

Figure 1:
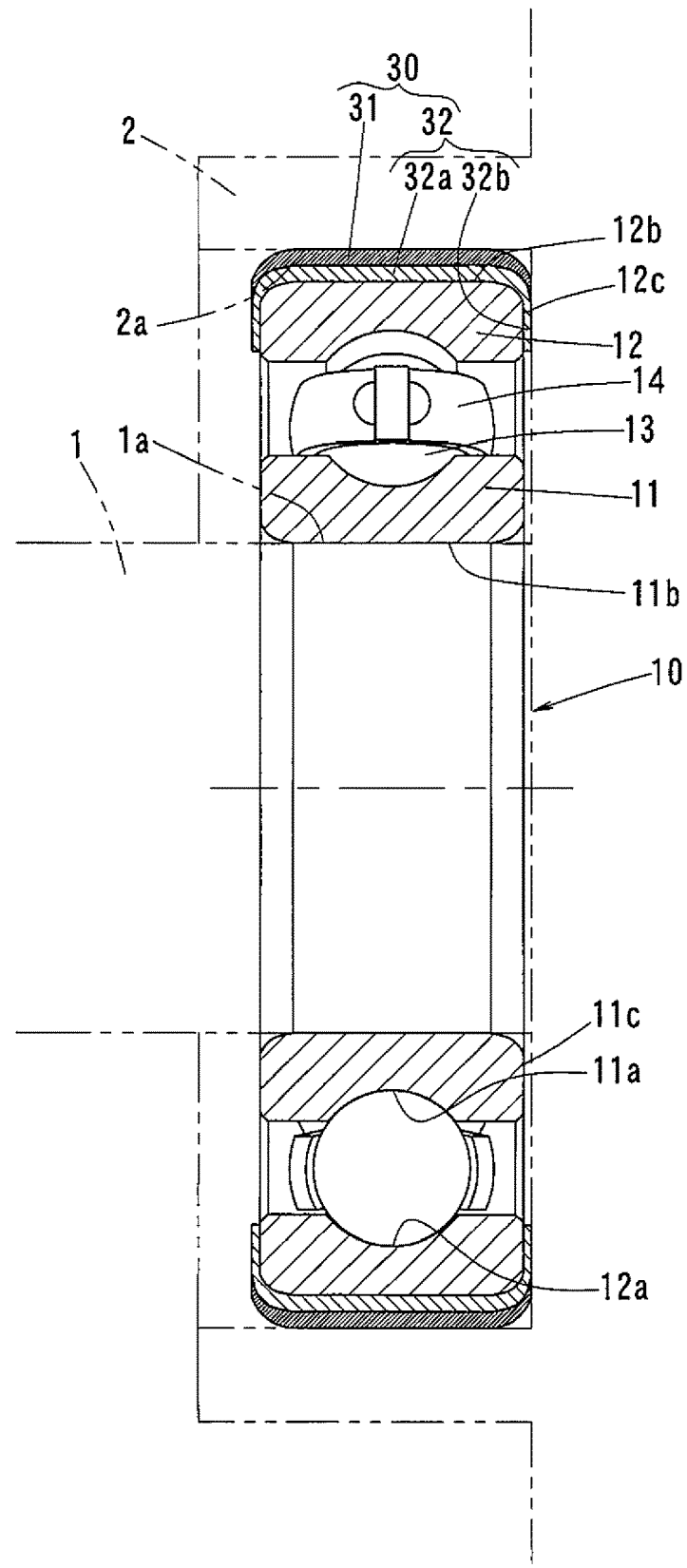
FIG. 1 is a sectional view showing a first embodiment of the rolling bearing according to the present invention.

Referring to the drawings, the first embodiment of the present invention is described.

Figure 2:
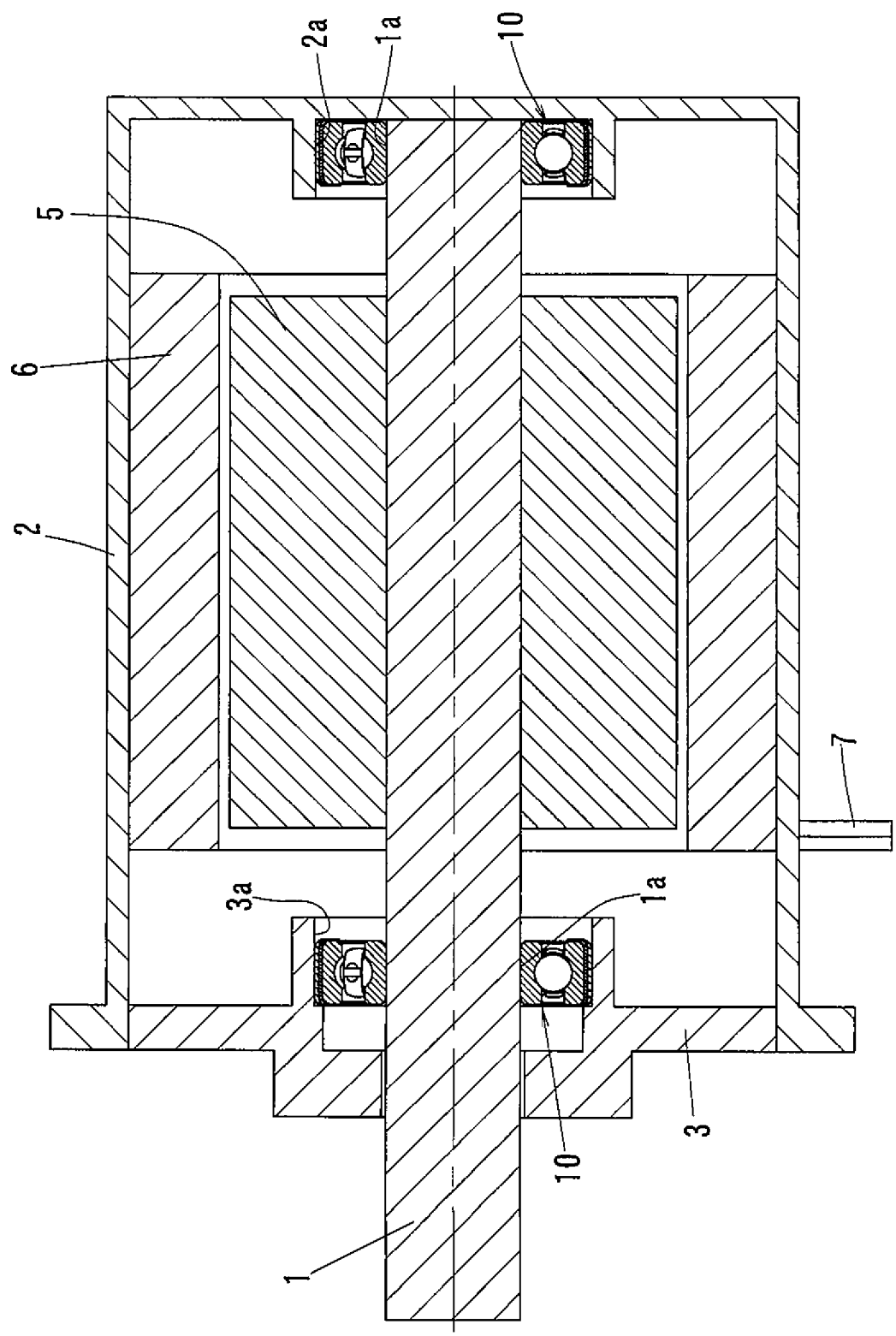
FIG. 2 is a sectional view of an EV motor to which the rolling bearings according to the present invention are mounted.

As shown in FIGS. 1 and 2, the rolling bearing 10 (either a first or a second rolling bearing 10) according to the first embodiment is disposed between a shaft 1 and a housing 2 surrounding the shaft 1.

In the following description, in an ideal state in which the rotation center axis, in design, of the rolling bearing 10 coincides with the rotation center axis of the shaft 1, the direction along the rotation center axis is referred to as the "axial direction", "axially" or "axial"; the direction along the circumference of a circle having a center at the rotation center axis is referred to as the "circumferential direction", "circumferential" or "circumferentially"; and a direction perpendicular to the rotation center axis is referred to as a "radial direction", "radially", or "radial"

The shaft 1 rotates relative to the housing 2. The shaft 1 is, for example, the rotary shaft of a motor of an electric vehicle (EV). The shaft 1 has cylindrical fitting surfaces 1a extending in the circumferential direction.

The housing 2 is stationary relative to the shaft 1, and supports the shaft 1 through the rolling bearing 10. The housing 2 is, for example, a partition wall forming a portion of a case of the above-described motor. The housing 2 has a cylindrical fitting surface 2a extending in the circumferential direction. This fitting surface 2a is concentric with the corresponding fitting surface 1a of the shaft 1.

The rolling bearing 10 supports the shaft 1 for rotation relative to the housing 2, and bears, for example, radial loads that act between the shaft 1 and the housing 2.

The EV motor shown in FIG. 2 includes the housing 2, which defines the outer perimeter of the motor; the shaft 1, which is inserted in the housing 2; and a rotor 5 mounted around the shaft 1 for rotation in unison with the shaft 1. Outside the rotor 5, a stator 6 is fixed to the inner side of the housing 2. A coil is mounted in the stator 6 and electricity is supplied to the coil via a lead wire 7. A flange bracket 3 is mounted to an opening of the housing 2. The shaft 1 extends through a center hole of the flange bracket 3. The flange bracket 3 has a cylindrical fitting surface 3a extending in the circumferential direction. This fitting surface 3a is also concentric with the corresponding fitting surface 1a of the shaft 1. The first rolling bearing 10 is disposed between the fitting surface 2a of the housing 2 on the bottom side (i.e., right side in FIG. 1) of the housing 2 and the corresponding fitting surface 1a of the shaft 1. The second rolling bearing 10 is disposed between the fitting surface 3a of the flange bracket 3 and the corresponding fitting surface 1a of the shaft 1.

The rolling bearings 10 each include an inner ring 11 mounted on the shaft 1, an outer ring 12 mounted to the housing 2 or the flange bracket 3, a plurality of rolling elements 13 disposed between the inner ring 11 and the outer ring 12, and a retainer 14 maintaining the circumferential distances between the rolling elements 13. The rolling bearings 10 shown are deep groove ball bearings.

The inner ring 11 is an annular bearing part having, on the outer periphery thereof, a raceway surface 11a extending in the circumferential direction, and on the inner periphery thereof, a radially inner surface 11b extending in the circumferential direction. The radially inner surface 11b is a cylindrical surface concentric with the fitting surface 1a of the shaft 1. The radially inner surface 11b of the inner ring 11 is fitted to the fitting surface 1a of the shaft 1.

The fit between the radially inner surface 11b of the inner ring 11 and the fitting surface 1a of the shaft 1 is an interference fit. Due to the interference fit, the inner ring 11 is fixed to the shaft 1 for rotation in unison with the shaft 1.

The outer ring 12 is an annular bearing part having, on the inner periphery thereof, a raceway surface 12a extending in the circumferential direction, and on the outer periphery thereof, a radially outer surface 12b extending in the circumferential direction. The radially outer surface 12b is a cylindrical surface concentric with the radially inner surface 11b of the inner ring 11.

The outer ring 12 is in a clearance fit with the housing 2.

The inner ring 11 and the outer ring 12 are both composed of steel such as SUJ2, SCM420, SCr420, SCR420 or SUS440. The inner ring 11 and the outer ring 12 are subjected to an appropriate treatment such as a quench and temper treatment, a carburizing treatment, or a carbonitriding treatment.

As shown in FIG. 1, in the first embodiment, the radially outer surface 12b of the outer ring 12 is covered with a coating layer 30. The coating layer 30 is a coating layer composite 30 comprising a plurality of layers. Of the plurality of layers of the coating layer composite 30, the surface layer at the radially outermost position is composed of an anti-creep film 31 having lubricity. The radially outer surface of this anti-creep film 31 serves as a fitting surface which is in a clearance fit with the fitting surface 2a of the housing 2 or the fitting surface 3a of the flange bracket 3.

The anti-creep film 31 may be, for example, a calcined film containing a resin binder and a solid lubricant. The resin binder is composed of a base material and a hardening agent and hardened by reacting the hardening agent. By solidifying the outside of the solid lubricant with the resin binder, the anti-creep film exhibits excellent adhesion properties and wear resistance. The anti-creep film also reduces wear of the housing 2 or the flange bracket 3. As the base material, due to its durability, a polyamideimide resin is preferable. As the hardening agent, for easy hardening, an epoxy resin and a reactive compound to be reacted with the epoxy resin are preferably used in combination.

The type of the epoxy resin used is not particularly limited provided it can be used as a hardening agent, such epoxy resins including bisphenol A epoxy resin, cresol novolac epoxy resin, biphenyl epoxy resin, brominated epoxy resin, and alicyclic epoxy resin. Examples of the reactive compound include aliphatic polyamine, polyaminoamide, polymercaptans, aromatic polyamine, acid anhydrides, and dicyandiamide. Besides these components, a hardening accelerator may be added for increased reactivity. Examples of the hardening accelerator include tertiary amines, tertiary amine salts, imidazole, phosphine, phosphonium salts and sulphonium salts.

In order for the solid lubricant to exhibit lubricity, it is preferably composed of a material softer than the material forming the housing 2, specifically a material having a hardness of Hv 50 to 150. Examples of the solid lubricant material includes molybdenum disulfide powder, graphite powder, tungsten disulfide, and polytetrafluoroethylene. Among them, preferably, molybdenum disulfide may be used alone, or a mixture of molybdenum disulfide and another or other materials may be used.

The anti-creep film 31 may further contain a friction/wear adjustor. The friction/wear adjustor is a material that improves the wear resistance of the calcined film, and is preferably selected from materials softer than the material forming the housing 2. Examples of such materials include antimony oxide, talc, mica, potassium titanate, tin, copper, zinc and nickel. Among them, antimony oxide is particularly preferable.

In order to form the anti-creep film 31 as the calcined film, a coating liquid is prepared by, for example, adding solid lubricant powder, friction/wear adjuster powder, and other components to a solvent into which the resin binder is dissolved. The coating liquid thus obtained is applied to the surface of the below-described insulating film or another intermediate film, and is heated to evaporate the solvent, thereby forming the anti-creep film 31.

At least one of the layers forming the coating layer composite 30 other than the anti-creep film 31 comprises an insulating film 32 having insulating properties. The insulating film 32 is formed on the outer periphery of the radially outer surface 12b, and the anti-creep film 31 is formed outside of the insulating film 32.

The insulating film 32 is composed of a material having insulating properties. The insulating film 32 provides insulation between the radially outer surface 12b of the outer ring 12 and the fitting surface 2a, 3a of the housing 2 or the flange bracket 3 to prevent leak current from the fitting surface 2a, 3a from reaching the radially outer surface 12b.

Examples of the material of the insulating film 32 include a ceramic material, an epoxy resin, and a polyamideimide resin. If a ceramic material, an epoxy resin, or a polyamideimide resin is used, the calcined film may be formed by heating the coated material. If an epoxy resin or a polyamideimide resin is used, calcining may be performed together with a hardening agent.

In order to prevent discharge between the rolling elements 13 and the raceway surfaces 11a and 12a by breaking the circuit of the flow of leakage current between the outer ring 12 and the inner ring 11, it is necessary to cover at least one of the radially outer surface 12b of the outer ring 12 and the radially inner surface 11b of the inner ring 11 with the coating layer composite containing the insulating film 32. By preventing discharge between the rolling elements 13 and the raceway surfaces 11a and 12a, electrolytic corrosion of the rolling elements 13 and the raceway surfaces 11a and 12a is prevented.

The insulating film 32 shown includes a center covering portion 32a covering the radially outer surface 12b of the outer ring 12, a side covering portion 32b covering a side surface 12c of the outer ring 12. The side surface 12c of the outer ring 12 is one of two side surfaces defining the width of the outer ring 12. The side surface 12c axially opposes the side surface of the housing 2 or the flange bracket 3.

The center covering portion 32a and the side covering portions 32b form an integral film. The side covering portion 32b provides insulation between the housing 2 or the flange bracket 3 and the side surface 12c of the outer ring 12, and by preventing discharge therebetween, the electrolytic corrosion of the housing 2 or the flange bracket 3 and the side surface 12c is prevented.

In the above-described rolling bearing 10 according to the first embodiment, among the plurality of layers constituting the coating layer composite 30 covering the radially outer surface 12b of the outer ring, the anti-creep film 31 as the surface layer serves as the fitting surface with the housing 2 or the flange bracket 2, exhibiting lubricity during creeping, thereby preventing friction and wear of the radially outer surface 12b of the outer ring 12 and the fitting surface 2a, 3a of the corresponding one of the housing 2 and the flange bracket 3. Further, because at least one of the plurality of layers constituting the coating layer composite 30 other than the surface layer or the anti-creep film 31 is composed of an insulating film 32 having insulating properties, the insulating film 32 breaks the circuit of the flow of leakage current, preventing discharge between the inner ring 11 or the outer ring 12 and the rolling elements 13, and thereby preventing electrolytic corrosion damage to the inner ring 11, the outer ring 12 and the rolling elements 13. Thus, in a use condition of the rolling bearing 10 in which leakage current reaches the inner ring 11 or the outer ring 12, and in which the inner ring 11 or the outer ring 12 is in a clearance fit, respectively, with the shaft 1 or one of the housing 2 and the flange bracket 3, the rolling bearing 10 exhibits both creep resistance and resistance to electrolytic corrosion.

Further, since the insulating film 32 of the coating layer composite 30 includes the side covering portion 32b covering the side surface 12c of the outer ring 12, the insulating film 32 prevents discharge between the side surface 12c of the outer ring 12 and one of the housing 2 and the flange bracket 3 that opposes the side surface 12c, thereby preventing electrolytic corrosion of e.g., the side surface 12c.

The coating layer composite 30 is not limited to the two-layer structure as shown. For example, a film having a different function may be disposed between the radially outer surface 12b and the anti-creep film 31, and also, an additional insulating film and an additional anti-creep film may be laminated between the insulating film 32 and the anti-creep film 31. Since, in an environment where alternating current flows, the capacitance is involved in the electrolytic corrosion resistance performance, the films need to have a certain amount of capacitance. Since the necessary capacitance is determined by the structure of the parts, the materials and thicknesses of the films, etc., the necessary capacitance is properly determined according to the use environment.

Figure 3:
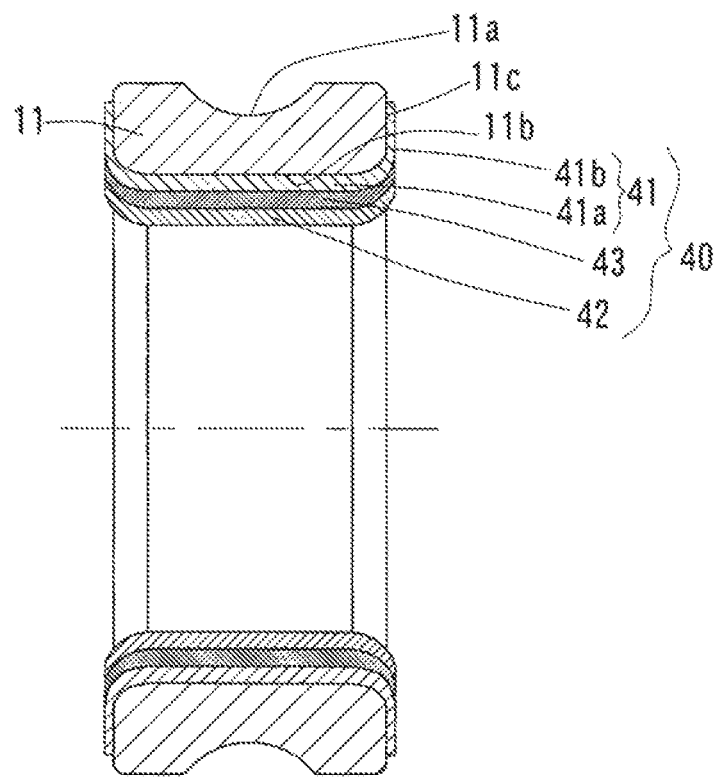
FIG. 3 is a sectional view showing an inner ring of the second embodiment of the rolling bearing according to the present invention.

The second embodiment is described with reference to FIG. 3. The description is limited to what differs from the first embodiment.

In the rolling bearing of the second embodiment, the radially inner surface 11b of the inner ring 11 is covered with a coating layer composite 40 comprising a plurality of layers. The coating layer composite 40 includes an insulating film 41 having a center covering portion 41a covering the radially inner surface 11b of the inner ring 11, and a side covering portion 41b covering a side surface 11c of the inner ring 11. The side surface 11c is one of two side surfaces defining the width of the inner ring 11. The side surface 11c axially opposes the side surface of the housing 2 or the flange bracket 3.

The coating layer composite 40 further includes an anti-creep film 42, as a surface layer of the coating layer composite 40, which forms a fitting surface fitted to the fitting surface 1a of the shaft 1. In this embodiment, the anti-creep film 41 exhibits anti-creep properties against the shaft 1.

The insulating film 41 and the anti-creep film 42 may have the same structures and may be formed by the same methods, as the insulating film and the anti-creep film of the first embodiment.

The coating layer composite 40 further includes an intermediate layer 43 between the insulating film 41 and the anti-creep film 42. The anti-creep film 42 is formed, as the surface layer, on the front side of the intermediate layer 43.

The structure of the intermediate layer 43 is not particularly limited provided it does not interfere with the performances of the insulating film 41 and the anti-creep film 42. For example, it may have the capability of improving insulating properties, have the capability of strongly fixing the anti-creep film 42 in position, or may have other properties. For example, where the adhesion between the insulating film 41 and the anti-creep film 42 tends to be insufficient if they are directly laminated together, an intermediate layer 43 that shows good adhesion to both of them may be used. If the insulating film 41 and the anti-creep film 42 alone are not capable of achieving the required capacitance, an intermediate layer 43 may be selected which enables, in combination of the three, to achieve the required capacitance. While not shown, the intermediate layer 43 may be formed not only between the insulating film 41 and the anti-creep film 42 but also between the insulating film 41 and the inner ring 11. The intermediate layer 43 may have, instead of the single-layer structure, a multi-layer structure.

According to the second embodiment, the insulating film 41 breaks the circuit of the flow of leakage current, thereby preventing electrolytic corrosion damage to the inner ring 11, the outer ring 12, and the rolling elements 13 by preventing discharge between the inner ring 11 or the outer ring and the rolling elements 13, and also preventing the electrolytic corrosion of, for example, the side surface 11c by preventing discharge between the side surface 11c of the inner ring 11 and one of the housing 2 and the flange bracket 3 that opposes the side surface 11c of the inner ring 11.

Figure 4:
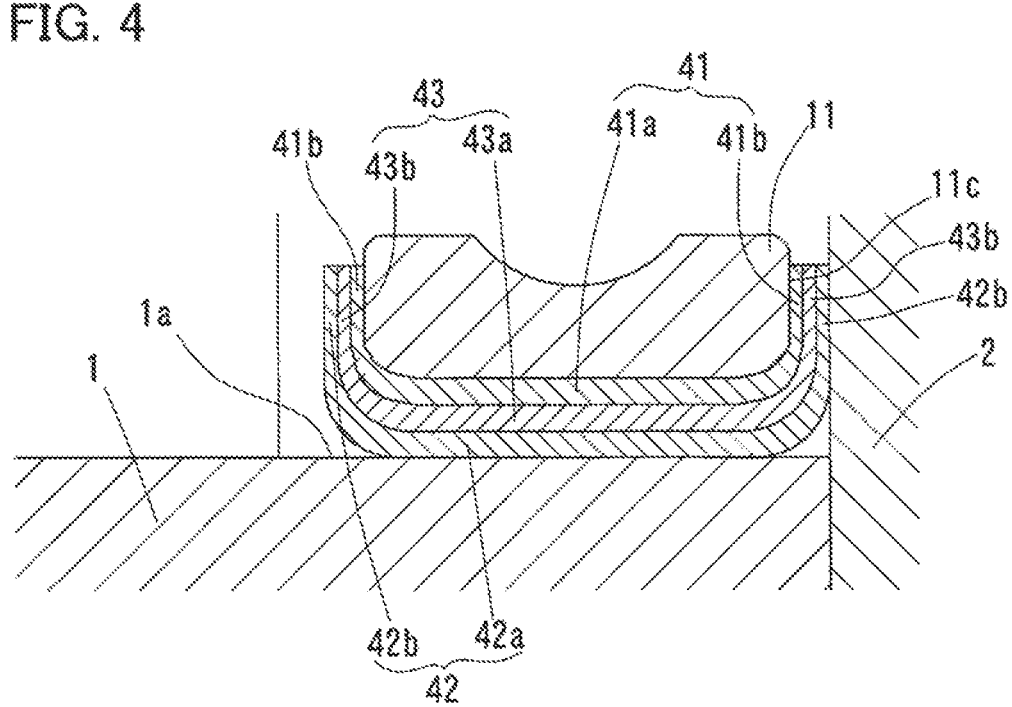
FIG. 4 is an enlarged sectional view showing the positional relationship between the inner ring of the third embodiment and the housing, of the rolling bearing according to the present invention.

The third embodiment is described with reference to FIG. 4.

The third embodiment differs from the second embodiment in that the anti-creep film 42 includes an extended covering portion 42b covering a portion of the inner ring 11 other than its radially inner surface 11b, and in contact with the housing 2. The center covering portion 43a of the intermediate layer 43 is superposed on the center covering portion 41a of the insulating film 41, while the center covering portion 42a of the anti-creep film 42 is superposed on the center covering portion 43a of the intermediate layer 43. The side covering portion 43b of the intermediate layer 43 is superposed on the side covering portion 41b of the insulating film 41, while the extended covering portion 42b of the anti-creep film 42 is superposed on the side covering portion 43b of the intermediate layer 43.

When the inner ring 11 creeps, the extended covering portion 42b of the anti-creep film 42 slides on the side surface of the housing 2 in the circumferential direction. Thus, the extended covering portion 42b prevents friction and wear between the side surface 11c of the inner ring 11 and the housing 2.

Thus, according to the third embodiment, because the anti-creep film 42 of the coating layer composite 40 includes an extended covering portion 42b covering a portion of the inner ring 11 other than its radially inner surface 11b (i.e., side surface 11c), and in contact with the housing 2, the extended covering portion 42b prevents wear and friction between the above inner ring portion (side surface 11c) and the housing 2.

While, in the embodiment, because the inner ring 11 is axially supported by the housing 2, the side surface 11c of the inner ring 11 is protected against the housing 2 by the extended covering portion 42b, if the inner ring 11 includes on its outer peripheral side a portion to be supported by the housing 2 (such as a shoulder or a chamfer), the extended covering portion may be superposed on this outer peripheral portion.

In an arrangement of the first embodiment, in which the coating layer composite is formed on the outer ring 12, the coating layer composite may include a portion corresponding to the extended covering portion, thereby preventing friction and wear between the side surface of the outer ring and the shaft.

In the second and third embodiments, the outer ring of the first embodiment may be used, or the outer ring may be free of the coating layer composite.

The embodiments disclosed here are mere examples in every respect, and should not be considered restrictive. The scope of the invention should be interpreted by the claims and not by the description, and includes every modification within the meaning and range that are equivalent to the claims.

DESCRIPTION OF THE REFERENCE SYMBOLS

1. Shaft
1a. Fitting surface
2. Housing
2a. Fitting surface
10. Rolling bearing
11. Inner ring
11a. Raceway surface
11b. Radially inner surface
11c. Side surface
12. Outer ring
12a. Raceway surface
12b. Radially outer surface
12c. Side surface
13. Rolling element
30, 40. Coating layer composite
31, 42. Anti-creep film
32, 41. Insulating film
32a, 41a, 42a. Center covering portion
32b, 41b. Side covering portion
42b. Extended covering portion
43. Intermediate layer
43a. Center covering portion
43b. Side covering portion

What is claimed is:

1. A rolling bearing comprising:
an inner ring having a radially inner surface,
an outer ring having a radially outer surface, and
rolling elements between the inner ring and the outer ring,
wherein at least one of the radially inner surface of the inner ring and the radially outer surface of the outer ring is covered with a coating layer,
wherein the coating layer comprises a coating layer composite composed of a plurality of layers,
wherein a surface layer of the plurality of layers is composed of an anti-creep film having lubricity,
wherein at least one of the plurality of layers excluding the surface layer is composed of an insulating film having insulation properties, and
wherein the insulating film is a calcined film containing at least one of a ceramic material, an epoxy-based resin and a polyamideimide-based resin.

2. The rolling bearing of claim 1, wherein the anti-creep film of the coating layer composite is a sintered film containing a resin binder and solid lubricant powder.

3. The rolling bearing of claim 2, wherein the insulating film of the coating layer composite includes a side covering portion covering either one of side surfaces defining a width of the outer ring, or one of side surfaces defining a width of the inner ring.

4. The rolling bearing of claim 3, wherein the anti-creep film of the coating layer composite includes an extended covering portion covering one of a portion of the inner ring other than the radially inner surface thereof, and a portion of the outer ring other than the radially outer surface thereof, the extended covering portion being in contact with a shaft or a housing.

5. The rolling bearing of claim 2, wherein the anti-creep film of the coating layer composite includes an extended covering portion covering one of a portion of the inner ring other than the radially inner surface thereof, and a portion of the outer ring other than the radially outer surface thereof, the extended covering portion being in contact with a shaft or a housing.

6. The rolling bearing of claim 1, wherein the insulating film of the coating layer composite includes a side covering portion covering either one of side surfaces defining a width of the outer ring, or one of side surfaces defining a width of the inner ring.

7. The rolling bearing of claim 6, wherein the anti-creep film of the coating layer composite includes an extended covering portion covering one of a portion of the inner ring other than the radially inner surface thereof, and a portion of the outer ring other than the radially outer surface thereof, the extended covering portion being in contact with a shaft or a housing.

8. The rolling bearing of claim 1, wherein the anti-creep film of the coating layer composite includes an extended covering portion covering one of a portion of the inner ring other than the radially inner surface thereof, and a portion of the outer ring other than the radially outer surface thereof, the extended covering portion being in contact with a shaft or a housing.

9. A rolling bearing comprising:
an inner ring having a radially inner surface,
an outer ring having a radially outer surface, and
rolling elements between the inner ring and the outer ring,
wherein at least one of the radially inner surface of the inner ring and the radially outer surface of the outer ring is covered with a coating layer,
wherein the coating layer comprises a coating layer composite composed of a plurality of layers,
wherein a surface layer of the plurality of layers is composed of an anti-creep film having lubricity,
wherein at least one of the plurality of layers excluding the surface layer is composed of an insulating film having insulation properties, and
wherein the anti-creep film is a sintered film containing a resin binder and solid lubricant powder.

10. The rolling bearing of claim 9, wherein the insulating film of the coating layer composite includes a side covering portion covering either one of side surfaces defining a width of the outer ring, or one of side surfaces defining a width of the inner ring.

11. The rolling bearing of claim 10, wherein the anti-creep film of the coating layer composite includes an extended covering portion covering one of a portion of the inner ring other than the radially inner surface thereof, and a portion of the outer ring other than the radially outer surface thereof, the extended covering portion being in contact with a shaft or a housing.

12. The rolling bearing of claim 9, wherein the anti-creep film of the coating layer composite includes an extended covering portion covering one of a portion of the inner ring other than the radially inner surface thereof, and a portion of the outer ring other than the radially outer surface thereof, the extended covering portion being in contact with a shaft or a housing.

* * * * *